United States Patent
Nobori

(10) Patent No.: US 9,881,363 B2
(45) Date of Patent: Jan. 30, 2018

(54) IMAGE PROCESSING DEVICE, PROJECTOR AND IMAGE PROCESSING METHOD FOR CORRECTING A DISPLAYED IMAGE

(71) Applicant: SEIKO EPSON CORPORATION, Tokyo (JP)

(72) Inventor: Tatsuhiko Nobori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 129 days.

(21) Appl. No.: 14/185,521

(22) Filed: Feb. 20, 2014

(65) Prior Publication Data

US 2014/0240358 A1 Aug. 28, 2014

(30) Foreign Application Priority Data

Feb. 27, 2013 (JP) .................................. 2013-036780

(51) Int. Cl.
*G06T 5/00* (2006.01)
(52) U.S. Cl.
CPC .................... *G06T 5/006* (2013.01)
(58) Field of Classification Search
CPC .................... H04N 5/74; A61B 5/06
USPC .......................................... 353/70; 606/130
See application file for complete search history.

(56) References Cited

U.S. PATENT DOCUMENTS

| 6,963,348 B2 | 11/2005 | Diamond et al. |
| 8,780,280 B2 * | 7/2014 | Nagano ..................... G06T 3/40 348/745 |
| 2003/0074011 A1 * | 4/2003 | Gilboa ..................... A61B 5/06 606/130 |
| 2003/0210381 A1 * | 11/2003 | Itaki ......................... H04N 5/74 353/70 |
| 2005/0024597 A1 | 2/2005 | Kubo et al. |
| 2009/0237620 A1 | 9/2009 | Yamamoto et al. |

FOREIGN PATENT DOCUMENTS

| JP | 2004-129212 A | 4/2004 |
| JP | 2005-039784 A | 2/2005 |
| JP | 2009-229563 A | 10/2009 |
| JP | 2009-229564 A | 10/2009 |

OTHER PUBLICATIONS

Splice and Edit Shapes and Lines in Flash CS5; Dec. 9, 2011; Jennifer Smith, Christopher Smith, and Fred Gerantabee.*
ADR , Editing Shape, Jun. 28, 2006.*
AutoCAD 2010 User Documentation, the release date of 2010 is Mar. 24, 2009.*

* cited by examiner

*Primary Examiner* — Devona Faulk
*Assistant Examiner* — Kevin Wu
(74) *Attorney, Agent, or Firm* — Oliff PLC

(57) ABSTRACT

An image processing device includes a selection section adapted to select a first correction point among a plurality of correction points included in a correcting image, an identification section adapted to identify a second correction point and a third correction point adjacent to the first correction point, and a display control section adapted to emphasize a first line segment connecting the first correction point and the second correction point to each other, and a second line segment connecting the first correction point and the third correction point to each other, and display the correcting image on a display section.

5 Claims, 7 Drawing Sheets

IMAGE PROCESSING DEVICE, PROJECTOR AND IMAGE PROCESSING METHOD FOR CORRECTING A DISPLAYED IMAGE

The entire disclosure of Japanese Patent Application No. 2013-036780, filed Feb. 27, 2013 is expressly incorporated by reference herein.

BACKGROUND

1. Technical Field

The present invention relates to an image processing device, a projector, and an image processing method.

2. Related Art

In the case in which a projector is installed so as to be shifted from an ideal positional relationship with respect to a screen, a distortion occurs in the image projected on the screen. Further, in the case of projecting the image on a nonplanar surface, a distortion also occurs in the image thus projected. Therefore, it has been known the fact that the projector is provided with a function of correcting the distortion of the image thus projected. The specification of U.S. Pat. No. 6,963,348 (Document 1) discloses the fact that in the case of correcting the distortion, a handle is displayed at the correction point.

In Document 1, the correction point is just indicated by the position of the handle, and the user fails to get the idea of the image with the distortion corrected. Therefore, the method described in Document 1 has a problem that it is difficult for the user to intuitively perform the operation of correcting the distortion.

SUMMARY

An advantage of some aspects of the invention is to allow the user to more intuitively perform the operation of correction the distortion of the image.

An aspect of the invention is directed to an image processing device including a selection section adapted to select a first correction point among a plurality of correction points included in a correcting image, an identification section adapted to identify a second correction point and a third correction point adjacent to the first correction point, and a display control section adapted to emphasize a first line segment connecting the first correction point and the second correction point to each other, and a second line segment connecting the first correction point and the third correction point to each other, and display the correcting image on a display section. According to the present image processing device, the user can intuitively perform the operation of correcting the distortion of the image without directly indicating the correction points.

In a preferred aspect of the invention, in a case in which the first correction point moves along a plurality of axes, the display control section provides the emphasis different between the first line segment and the second line segment to the first line segment and the second line segment, and displays the correcting image on the display section. According to the present image processing device, the user can intuitively perform the operation of correcting the distortion of the image even in the case in which the first correction point moves on the outline of the correcting image.

In another preferred aspect of the invention, in a case in which the first correction point moves along a single axis, the display control section provides the same emphasis to the first line segment and the second line segment, and displays the correcting image on the display section. According to the present image processing device, the user can intuitively perform the operation of correcting the distortion of the image without providing emphasis different between the first line segment and the second line segment to the first line segment and the second line segment.

In another preferred aspect of the invention, the display control section displays an image corrected in accordance with movement of the first correction point together with the correcting image deformed due to the movement of the first correction point on the display section. According to the present image processing device, the user can perform the operation of correcting the distortion of the image while looking at the image corrected.

In another preferred aspect of the invention, the display control section provides the emphasis, which is different between before and after the selection of the first correction point is fixed by a user, to the first line segment and the second line segment, and displays the correcting image on the display section. According to the present image processing device, the user can perceive the fact that the selection of the correction point is fixed.

In another preferred aspect of the invention, the emphasis is performed by one of changing one of a color, a width, and a type of the first line segment and the second line segment from one of a color, a width, and a type of other line segments than the first line segment and the second line segment among line segments constituting an outline of the correcting image, and blinking the first line segment and the second line segment. According to the present image processing device, the user can visually figure out the first correction point.

Another aspect of the invention is directed to a projector including a projection section adapted to project an image on a projection surface, a selection section adapted to select a first correction point among a plurality of correction points included in a correcting image, an identification section adapted to identify a second correction point and a third correction point adjacent to the first correction point in a predetermined direction, and a display control section adapted to emphasize a first line segment connecting the first correction point and the second correction point to each other, and a second line segment connecting the first correction point and the third correction point to each other, and make the projection section project the correcting image. According to the present projector, the user can intuitively perform the operation of correcting the distortion of the image without directly indicating the correction points.

Still another aspect of the invention is directed to a image processing method including selecting a first correction point among a plurality of correction points included in a correcting image, identifying a second correction point and a third correction point adjacent to the first correction point in a predetermined direction, and emphasizing a first line segment connecting the first correction point and the second correction point to each other, and a second line segment connecting the first correction point and the third correction point to each other, and displaying the correcting image on a display section. According to the present image processing method, the user can intuitively perform the operation of correcting the distortion of the image without directly indicating the correction points.

BRIEF DESCRIPTION OF THE DRAWINGS

The invention will now be described with reference to the accompanying drawings, wherein like numbers reference like elements.

DESCRIPTION OF AN EXEMPLARY EMBODIMENT

Figure 1:
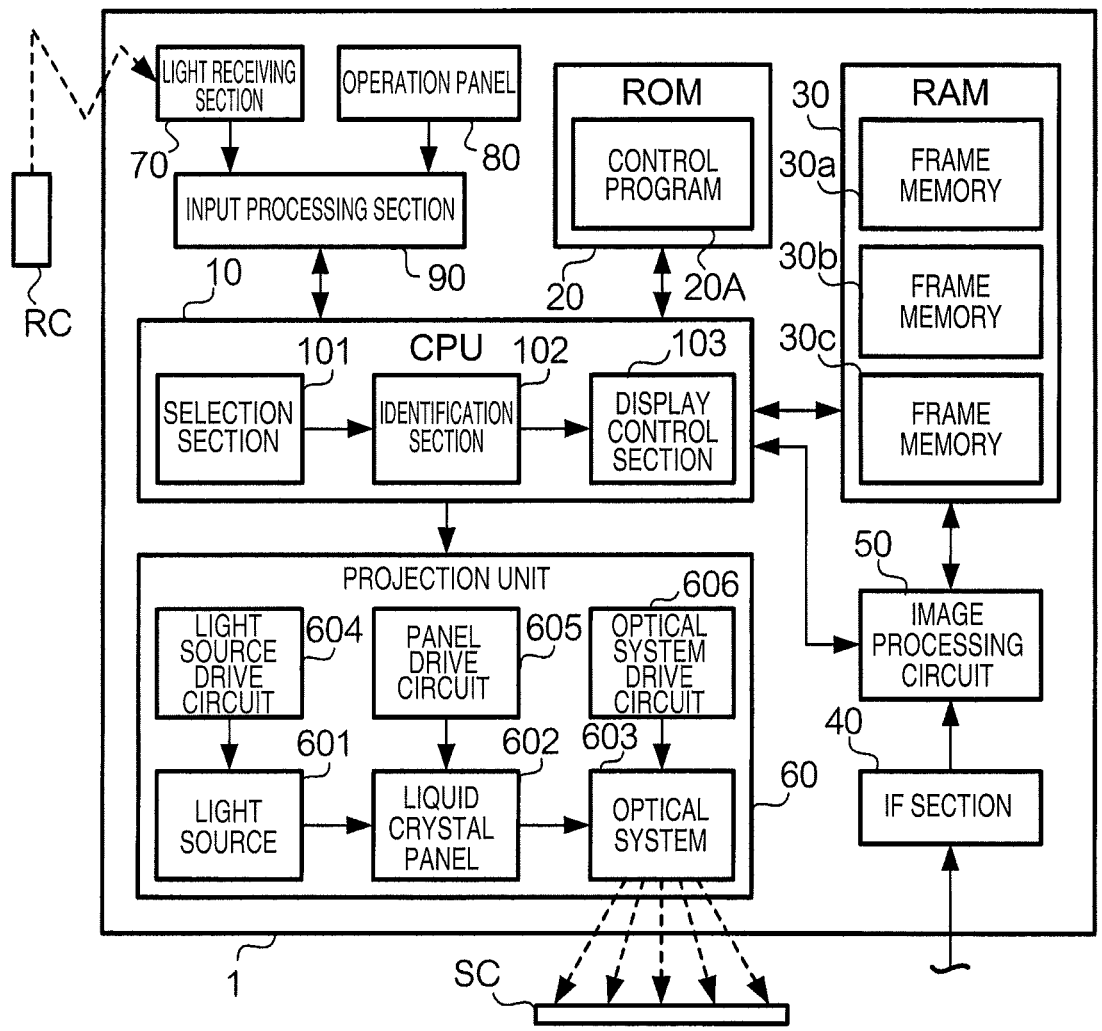
FIG. 1 is a block diagram showing an internal configuration of a projector.

FIG. 1 is a block diagram showing an internal configuration of a projector 1 according to an embodiment of the invention. The projector 1 is a device for projecting an image (hereinafter referred to as a "main image"), which corresponds to a video signal input thereto, on the screen SC. The screen SC is a surface reflecting an image projected from the projector 1. In the case in which a projection axis of the projector 1 is tilted from the ideal state with respect to the screen SC, or in the case in which the screen SC is a nonplanar surface, the image reflected on the screen SC becomes distorted. The projector 1 has a function of correcting the distortion of the image reflected on the screen SC. Hereinafter, the process of the projector 1 correcting the distortion of the image is expressed as a "distortion correction process." The distortion correction process is performed in response to the user operating a controller RC. The controller RC is a device for controlling the projector 1 using wireless communication such as infrared communication, a so-called remote controller. The projector 1 projects an image (hereinafter referred to as a "correcting image") for correction, which is used by the user for performing an operation of the distortion correction process, on the screen SC. The correcting image functions as a user interface for performing the distortion correction. The user operates the controller RC while looking at the correcting image projected on the screen SC to correct the distortion of the image. The correcting image includes a plurality of correction points moving in response to the operation by the user.

The projector 1 includes a central processing unit (CPU) 10, a read only memory (ROM) 20, a random access memory (RAM) 30, an interface (IF) section 40, an image processing circuit 50, a projection unit 60, a light receiving section 70, an operation panel 80, and an input processing section 90. The CPU 10 is a control device which executes a control program 20A to thereby control each of the sections of the projector 1. The ROM 20 is a storage device storing a variety of programs and data. The ROM 20 stores the control program 20A executed by the CPU 10, and correcting image data representing the correcting image.

The RAM 30 includes a frame memory 30a, a frame memory 30b, and a frame memory 30c. The frame memory 30a is an area for storing an image corresponding to one frame of a video image represented by the video signal. The frame memory 30b is an area for storing the data representing the correcting image to be displayed. The frame memory 30c is an area for storing a composite image obtained by superimposing the correcting image on the main image. The IF section 40 obtains the video signal from an external device such as a DVD (Digital Versatile Disc) player or a personal computer.

The IF section 40 is provided with a variety of types of terminals (e.g., a USB (Universal Serial Bus) terminal, a LAN (Local Area Network) terminal, an S terminal, an RCA terminal, a D-sub (D-subminiature) terminal, and an HDMI (High-Definition Multimedia Interface) terminal) for connecting to the external device. The IF section 40 extracts vertical and horizontal sync signals from the video signal thus obtained. The image processing circuit 50 performs image processing on the image represented by the video signal. The image processing circuit 50 writes the data representing the image, on which the image processing has been performed, in the frame memory 30a as the main image data by one frame.

The CPU 10 has a selection section 101, an identification section 102, and a display control section 103 as functional elements. The selection section 101 selects one correction point (hereinafter referred to as a "first correction point") among a plurality of correction points included in the correcting image. The first correction point is a point moving along a single axis or a plurality of axes in response to the user operating the controller RC, and the main image is geometrically corrected based on the coordinate of the first correction point after the movement. The identification section 102 identifies two correction points (hereinafter referred to as a "second correction point" and a "third correction point") adjacent to the first correction point in a predetermined direction. The display control section 103 performs the image processing, which emphasizes a first line segment connecting the first correction point and the second correction point to each other, and a second line segment connecting the first correction point and the third connection point to each other, on the correcting image, and then writes the correcting image on which the image processing has been performed in the frame memory 30b as the correcting image data. The display control section 103 also generates composite image data obtained by combining the main image data written in the frame memory 30a and the correcting image data written in the frame memory 30b with each other, and then writes the composite image in the frame memory 30c. The display control section 103 outputs the composite image data to the projection unit 60 at a timing represented by the sync signal.

The projection unit 60 includes a light source 601, liquid crystal panels 602, an optical system 603, a light source drive circuit 604, a panel drive circuit 605, and an optical system drive circuit 606. The light source 601 has a lamp such as a high-pressure mercury lamp, a halogen lamp, or a metal halide lamp, or one of other light emitting bodies, and irradiates the liquid crystal panels 602 with light. The liquid crystal panels 602 are each a light modulation device for modulating the light emitted from the light source 601 in accordance with the image data. In the present example, each of the liquid crystal panels 602 has a plurality of pixels arranged in a matrix. Each of the liquid crystal panels 602 has the resolution of, for example, XGA (eXtended Graphics Array), and has a display area composed of 1024×768 pixels. In this example, the liquid crystal panels 602 are each a transmissive liquid crystal panel, and the transmittance of each of the pixels is controlled in accordance with the image data. The projector 1 has three liquid crystal panels 602 corresponding respectively to the three primary colors of RGB. The light from the light source 601 is separated into colored lights of three colors of RGB, and the colored lights respectively enter the corresponding liquid crystal panels 602. The colored lights, which have been modulated while passing through the respective liquid crystal panels, are combined by a cross dichroic prism or the like, and then emitted to the optical system 603. The optical system 603 includes a lens for enlarging the light modulated by the liquid crystal panels 602 into the image light and then projecting the light on the screen SC, a zoom lens for performing expansion/contraction of the image to be projected and the focus adjustment, a zoom controlling motor for controlling a zoom level, a focus adjusting motor for performing the focus adjustment, and so on. The light source drive circuit 604 drives the light source 601 with the control by the CPU 10. The panel drive circuit 605 drives the liquid crystal panels 602 in accordance with the image data output from the CPU 10. The optical system drive circuit 606 drives the motors provided to the optical system 603 with the control by the CPU 10.

The light receiving section 70 receives an infrared signal transmitted from the controller RC, decodes the infrared signal thus received, and then outputs the result to the input processing section 90. The operation panel 80 has buttons and switches for performing ON/OFF of the power and a variety of operations of the projector 1. The input processing section 90 generates the information representing the content of the operation by the controller RC or the operation panel 80, and then outputs the information to the CPU 10.

Figure 2:
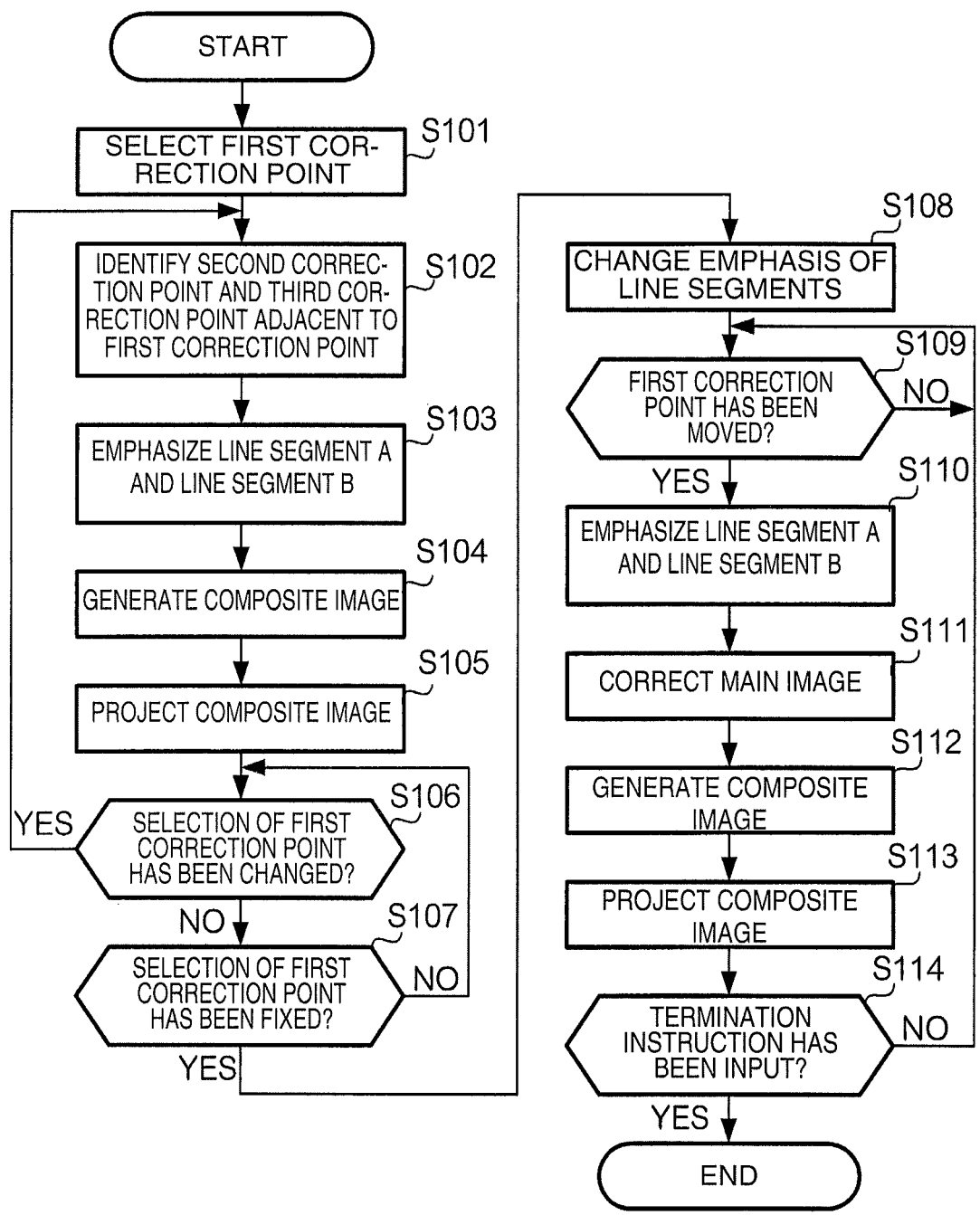
FIG. 2 is a flowchart showing a distortion correction process.

FIG. 2 is a flowchart showing the distortion correction process in the projector 1. The following process is triggered by the fact that, for example, the user operates the controller RC to input an instruction of starting the distortion correction process, and then the CPU 10 reads out the control program 20A. In the step S101, the CPU 10 selects the first correction point. Specifically, the CPU 10 identifies a predetermined correction point among the plurality of correction points included in the correcting image as the first correction point. Ordered identifiers are assigned to the plurality of correction points, and the CPU 10 identifies, for example, the correction point having the earliest identifier as the first correction point.

Figure 3:
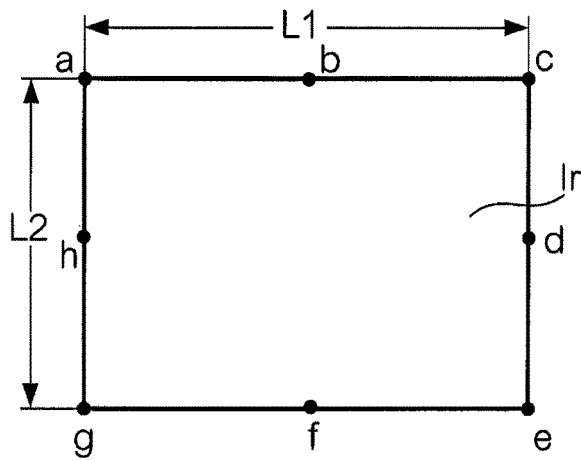
FIG. 3 is a diagram showing an example of a correcting image and correction points.

FIG. 3 is a diagram showing an example of the correcting image and the correction points. The correcting image shown in FIG. 3 as an example shows a correcting image drawn on the liquid crystal panels 602 (the same applies to FIG. 4 and the following drawings (except FIG. 9)). In the example shown in FIG. 3, the correcting image Ir is an image transparent in the area other than the outline, and having a rectangular shape. The eight correction points are disposed on the outline of the correcting image Ir. To the correction points, there are assigned the identifiers (an example of the ordered identifiers described above) of a through h in the alphabet, respectively. The point a, the point c, the point e, and the point g are the correction points disposed at the respective vertexes of the correcting image Ir. Hereinafter, the direction along the line segment ac or the line segment eg is expressed as an x-axis direction, and the direction along the line segment ce or the line segment ga is expressed as a y-axis direction. The point b, the point d, the point f, and the point h are the correction points disposed at the midpoints of the line segment ac, the line segment ce, the segment eg, and the line segment ga, respectively. The two correction points having the consecutive identifiers are adjacent to each other in the x-axis direction or the y-axis direction. It should be noted that each of the correction points is drawn for the sake of convenience of explanation, and the correction points are not displayed in the correcting image projected on the screen SC.

Figure 4:
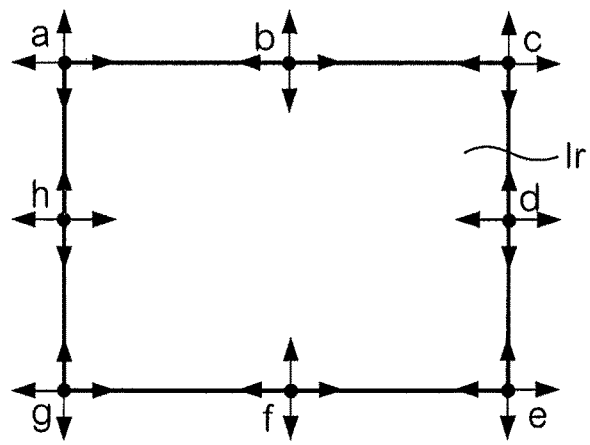
FIG. 4 is a diagram showing an example of moving directions of the correction points.

FIG. 4 is a diagram showing an example of the moving directions of the correction points. In the example shown in FIG. 4, the correction point (the correction point corresponding to either one of the point a through the point h) identified as the first correction point moves along the axes in the x-axis direction and the y-axis direction, respectively, in response to the operation by the user.

FIG. 2 is referred to again. In the step S102, the CPU 10 identifies the two correction points adjacent to the first correction point among the plurality of correction pints included in the correcting image Ir as the second correction point and the third correction point. Specifically, the CPU 10 identifies the previous correction point of the first correction point in the order represented by the identifiers as the second correction point, and identifies the next correction point of the first correction point as the third correction point. It should be noted that in the case in which the first correction point is the earliest, the last correction point is identified as the second correction point. Further, in the case in which the first correction point is the last one, the earliest correction point is identified as the third correction point. The second correction point and the third correction point are adjacent to the first correction point in predetermined directions (either of the x-axis direction and the y-axis direction in the initial state of the correcting image stored in the ROM 20), respectively.

For example, in the case in which the first correction point is the point b in the correcting image Ir shown in FIG. 3, the point a, which is the previous correction point in the alphabetical order, is identified as the second correction point, and the point c, which is the next correction point, is identified as the third correction point. In another example, in the case in which the first correction point is the point a, the point h, which is the last in the alphabetical order, is identified as the second correction point, and the point b, which is the next in the alphabetical order, is identified as the third correction point. In another example, in the case in which the first correction point is the point h, the point g, which is the previous correction point in the alphabetical order, is identified as the second correction point, and the point a, which is the earliest in the alphabetical order, is identified as the third correction point.

FIG. 2 is referred to again. In the step S103, the CPU 10 performs the emphasis of the line segment (hereinafter referred to as a "line segment A") connecting the first correction point and the second correction point to each other, and the line segment (hereinafter referred to as a "line segment B") connecting the first correction point and the third correction point to each other on the correcting image. Specifically, the CPU 10 writes the outline of the correcting image, which has been read out from the storage section 20, in the frame memory 30b, and on this occasion, the CPU 10 emphasizes the line segment A and the line segment B. The emphasis of the line segment A and the line segment B is performed in order to make the user perceive the first correction point thus selected. The "emphasis" of the line segment A and the line segment B denotes an action of displaying the line segment A and the line segment B with an appearance different from that of a reference line segment. The reference line segment is, for example, any of other line segments than the line segment A and the line segment B among the line segments constituting the outline of the correcting image, or in the case in which the first correction point is changed, the reference line segment is any of the line segments before the change, which correspond to the line segment A and the line segment B after the change. The emphasis of the line segment A and the line segment B is performed by, for example, changing the color, the width, or the type of the line segment A and the line segment B from the color, the width, or the type of the reference line segment, or by blinking the line segment A and the line segment B. The "type" of the line segment includes, for example, solid line, broken line, and dotted line. It should be noted that the reference line segment can also be transparent. Further, in the case in which the first correction point moves along a plurality of axes, the CPU 10 emphasizes the line segment A and the line segment B differently from each other. The CPU 10 writes the correcting image data with the line segment A and the line segment B emphasized in the frame memory 30b.

Figure 5:
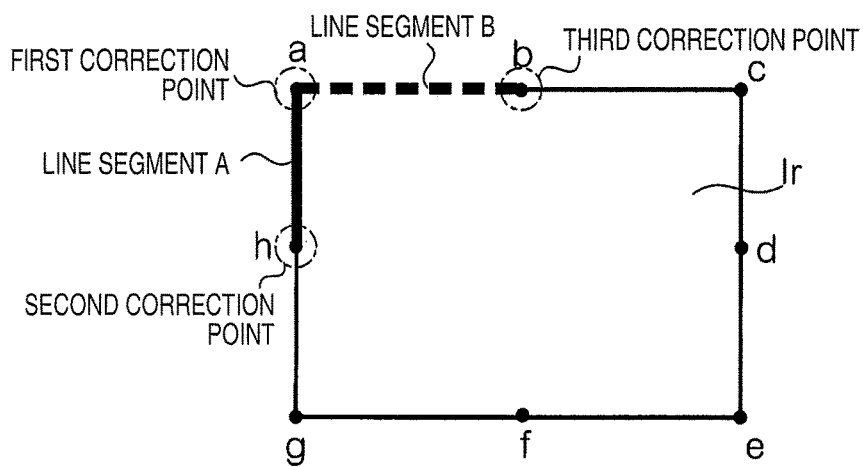
FIG. 5 is a diagram showing an example of emphasis of the correcting image.
Figure 6:
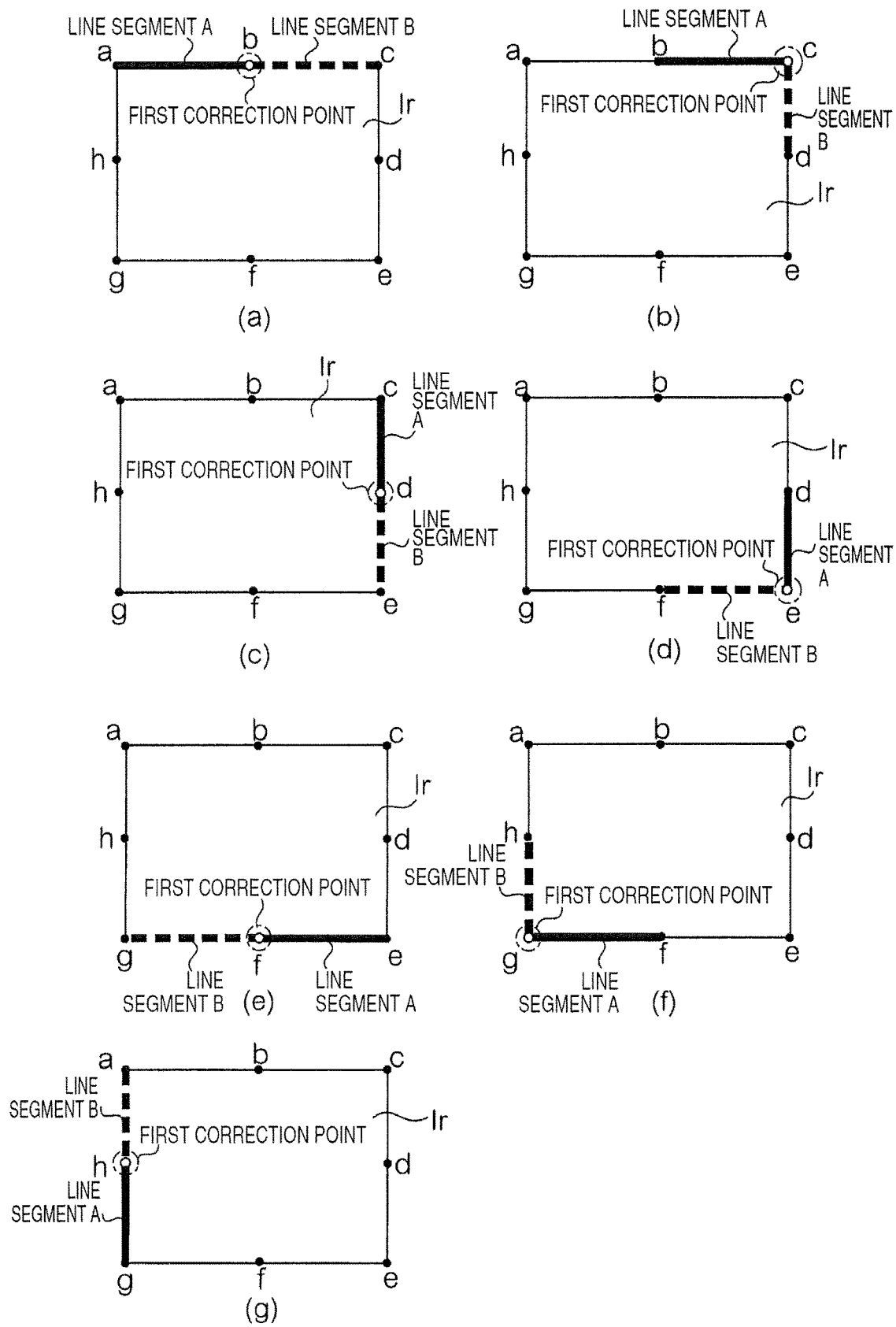
FIGS. 6A through 6G are diagrams showing changes in line segments drawn in the correcting image.

FIG. 5 is a diagram showing an example of the emphasis of the correcting image Ir. FIG. 5 shows the emphasis of the correcting image Ir in the case in which the first correction point is the point a. As described above, in the case in which the first correction point is the point a, the second correction point is the point h, and the third correction point is the point b. Therefore, the line segment ah corresponds to the line segment A, and the line segment ab corresponds to the line segment B. In the example shown in FIG. 5, the line segment A and the line segment B are emphasized by setting the width of the line segments larger than the width of the outline of the correcting image Ir before selecting the first correction point (namely, by setting the width of the line segment A and the line segment B larger than the width of the line segments other than the line segment A and the line segment B). Further, in the example shown in FIG. 5, the line segment A is represented by a solid line, and the line segment B is represented by a broken line, and thus the line segment A and the line segment B are emphasized differently from each other.

FIG. 2 is referred to again. In the step S104, the CPU 10 generates the composite image obtained by superimposing the correcting image on the main image. Specifically, the CPU 10 combines the main image data written in the frame memory 30a and the correcting image data written in the frame memory 30b with each other to thereby generate the composite image, and then writes the composite image in the frame memory 30c as the composite image data. In the step S105, the CPU 10 projects the composite image. The CPU 10 outputs the composite image data written in the frame memory 30c to the projection unit 60.

In the step S106, the CPU 10 determines whether or not the selection of the first correction point has been changed. The selection of the first correction point is changed by, for example, the user operating the arrow keys of the controller RC. In the case in which it is determined that the selection of the first correction point has been changed (YES in the step S106), the CPU 10 makes a transition of the process to the step S102. In the case in which it is determined that the selection of the first correction point has not been changed (NO in the step S106), the CPU 10 makes a transition of the process to the step S107.

FIGS. 6A through 6G are diagrams showing how the line segments drawn in the correcting image are changed in the case in which the selection of the first correction point has been changed. FIGS. 6A through 6G show the correcting images in the cases in which the point b through the point h are selected as the first correction point, respectively. For example, in the case in which the first correction point is changed from the point a to the point b, the line segment corresponding to the line segment A is transferred from the line segment ah to the line segment ba, and the line segment corresponding to the line segment B is transferred from the line segment ab to the line segment bc. On this occasion, the correcting image Ir changes from the state shown in FIG. 5 to the state shown in FIG. 6A due to the process of the step S103. In another example, in the case in which the user changes the first correction point in such a manner as the point b→the point c→the point d→the point e→the point f→the point g→the point h, the correcting image makes a transition from the state shown in FIG. 6A to the state shown in FIG. 6G through the states shown in FIGS. 6B through 6F.

FIG. 2 is referred to again. In the step S107, the CPU 10 determines whether or not the selection of the first correction point is fixed. The selection of the first correction point is fixed by, for example, the user pressing the determination button of the controller RC. In the case in which it is determined that the selection of the first correction point has been fixed (YES in the step S107), the CPU 10 makes a transition of the process to the step S108. In the case in which it is determined that the selection of the first correction point has not been fixed (NO in the step S107), the CPU 10 makes a transition of the process to the step S106.

In the step S108, the CPU 10 changes the emphasis of the line segment A and the line segment B. Specifically, the CPU 10 performs the emphasis, which is different between before and after the selection of the first correction point is fixed, on the line segment A and the line segment B. The change in emphasis of the line segment A and the line segment B is performed in order to make the user perceive the fact that the selection of the first correction point has been fixed. The change in the emphasis of the line segment A and the line segment B is performed by, for example, blinking the line segment A and the line segment B. In the step S109, the CPU 10 determines whether or not the first correction point has been moved. The movement of the first correction point is performed by, for example, the user operating the arrow keys of the controller RC. In the case in which it is determined that the first correction point has been moved (YES in the step S109), the CPU 10 makes a transition of the process to the step S110. In the case in which it is determined that the first correction point has not been moved (NO in the step S109), the CPU 10 waits the process until the first correction point is moved.

In the step S110, the CPU 10 performs the emphasis of the line segment A and the line segment B again on the correcting image. Specifically, the CPU 10 writes the outline of the correcting image, which has been read out from the storage section 20, in the frame memory 30b, and on this occasion, the CPU 10 emphasizes the line segment A and the line segment B. The CPU 10 emphasizes the line segment A and the line segment B based on the coordinate of the first correction point after the movement. In the case in which the emphasis of the line segment A and the line segment B is performed in the step S110, the correcting image is deformed.

Figure 7A:
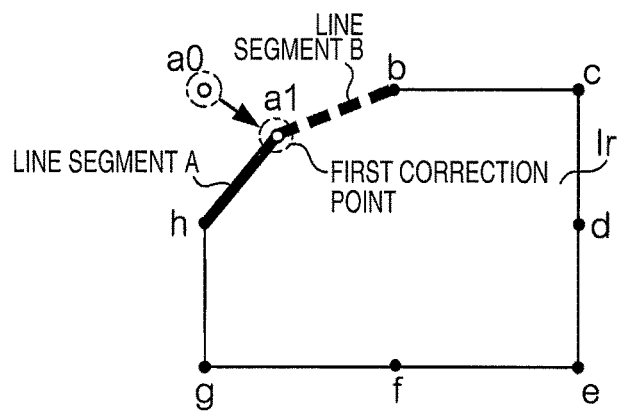
FIGS. 7A and 7B are diagrams showing movement of a first correction point.
Figure 7B:
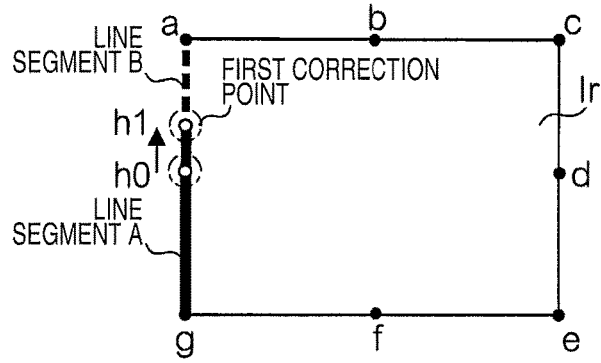

FIGS. 7A and 7B are diagrams showing the correcting image Ir in the case in which the first correction point has been moved. FIG. 7A shows the correcting image Ir in the case in which the point a, which has been selected as the first correction point, is moved from the position of a0 to the position of a1. In the example shown in FIG. 7A, the user has performed the operation of moving the point a in the x-axis direction and the y-axis direction. When the user moves the point a from the position of a0 to the position of a1, the line segment A is drawn in the position indicated by the line segment a1-h, and the line segment B is drawn in the position indicated by the line segment a1-b. FIG. 7B shows the correcting image Ir in the case in which the point h, which has been selected as the first correction point, is moved from the position of h0 to the position of h1 (i.e., the case in which the first correction point moves on the outline of the correcting image Ir). In the example shown in FIG. 7B, the user has performed the operation of moving the point h in the y-axis direction. When the user moves the point h from the position of h0 to the position of h1, the line segment A is drawn in the position indicated by the line segment h1-g, and the line segment B is drawn in the position indicated by the line segment h1-a. Since the emphasis is performed differently between the line segment A and the line segment B, even in the case in which the first correction point moves on the outline of the correcting image Ir as shown in FIG. 7B, the movement of the first correction point is perceived by the user due to the change in length of the line segment A and the line segment B.

FIG. 2 is referred to again. In the step S111, the CPU 10 geometrically corrects the main image based on the movement of the first correction point. Specifically, the pixels in each area of the correcting image and the pixels in each area of the main image are previously made to correspond to each other. The CPU 10 identifies the area, which corresponds to the area (hereinafter referred to as an "operation area") surrounded by the first correction point, the second correction point, the third correction point, and the centroid of the correcting image in the state before the distortion correction process is started, in the main image, and then performs the projective transformation corresponding to the movement of the first correction point on the pixels in that area. The CPU 10 writes the main image data representing the main image after the correction in the frame memory 30a.

Figure 8A:
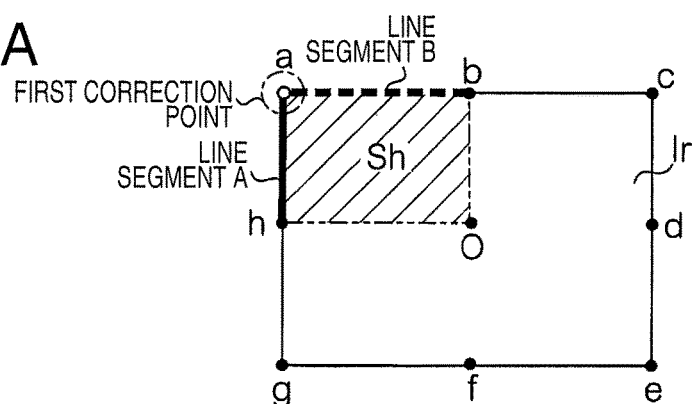
FIGS. 8A and 8B are diagrams showing an example of an operation area.
Figure 8B:
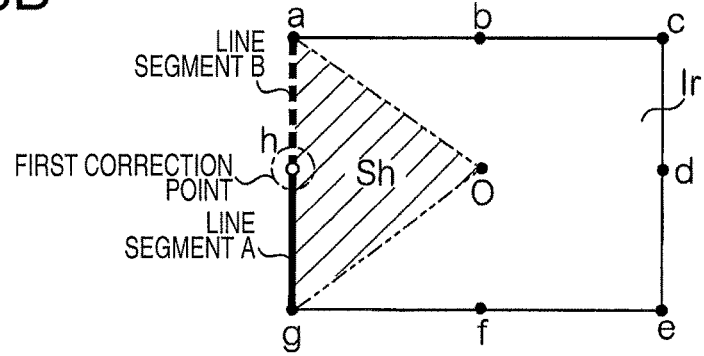

FIGS. 8A and 8B are diagrams showing an example of the operation area. In FIGS. 8A and 8B, the point O is the centroid of the correcting image Ir in the state before the distortion correction process is started. FIG. 8A shows the operation area Sh in the case in which the point a is moved. The operation area Sh in the case in which the point a is moved is an area surrounded by the point a, the point h, the point b, and the point O. FIG. 8B shows the operation area Sh in the case in which the point h is moved. The operation area Sh in the case in which the point h is moved is an area surrounded by the point h, the point g, the point a, and the point O.

FIG. 2 is referred to again. In the step S112, the CPU 10 generates the composite image obtained by superimposing the correcting image on the main image. Specifically, the CPU 10 writes the composite image obtained by combining the main image data, which represents the main image on which the correction has been performed and is written in the frame memory 30a, and the correcting image data written in the frame memory 30b with each other to thereby generate the composite image in the frame memory 30c as the composite image data. In the step S113, the CPU 10 projects the composite image. When the composite image is projected, the main image, which has been corrected in accordance with the movement of the first correction point, is reflected on the screen SC together with the correcting image.

Figure 9:
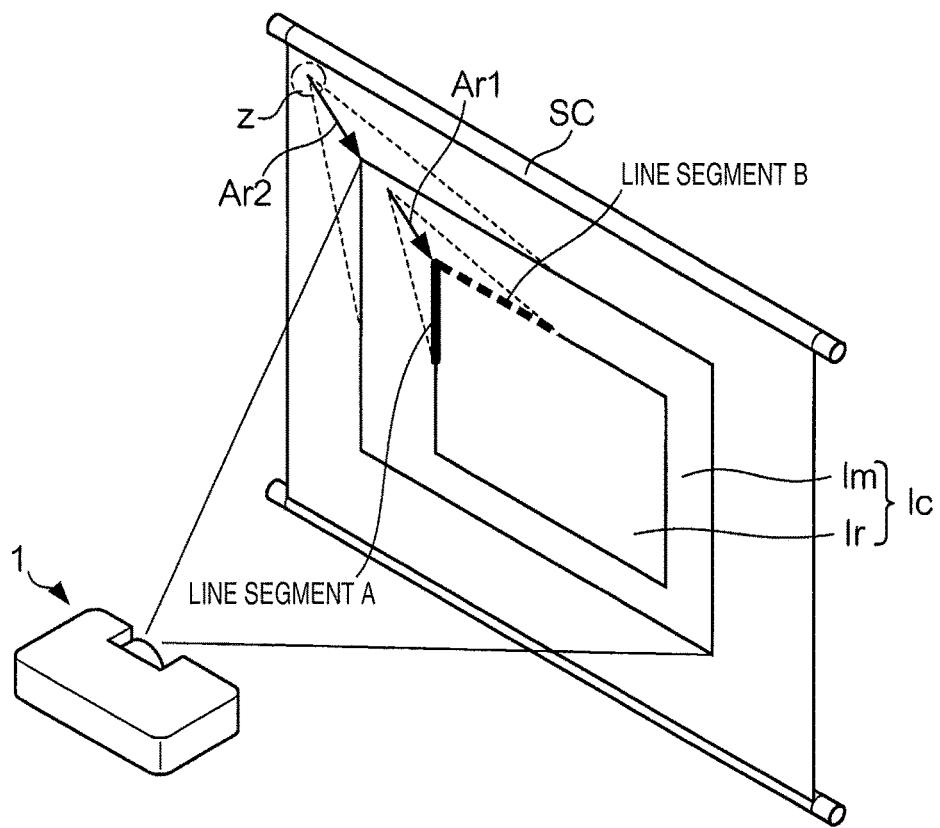
FIG. 9 is a diagram showing how a composite image is projected.

FIG. 9 is a diagram showing how the composite image Ic is projected on the screen SC. FIG. 9 shows an example in which the main image Im is geometrically corrected in accordance with the movement of the point a of the correcting image Ir. For example, when the point a of the correcting image Ir is moved in a direction of the arrow Ar1, the point z of the main image Im moves in a direction of the arrow Ar2. As shown in FIG. 9, when the correcting image Ir is projected on the screen SC with the line segment A and the line segment B emphasized, the user can get the idea of how the main image is corrected in accordance with the movement of the first correction point. Therefore, the user can more intuitively perform the operation of the distortion correction process. Further, it is possible to make the user perform the operation of the distortion correction process without displaying the correction points on the screen SC.

In the step S114, the CPU 10 determines whether or not a termination instruction for terminating the distortion correction process has been input. The termination instruction is input by, for example, the user pressing a termination button of the controller RC. In the case in which it is determined that the termination instruction has been input (YES in the step S114), the CPU 10 terminates the distortion correction process. When the distortion correction process is terminated, the projection of the correcting image is terminated, and the main image having been corrected is reflected on the screen SC. In the case in which it is determined that the termination instruction has not been input (NO in the step S114), the CPU 10 makes a transition of the process to the step S109.

MODIFIED EXAMPLES

The invention is not limited to the embodiment described above, but can be put into practice with a variety of modifications. Hereinafter, some modified examples will be explained. It is also possible to use two or more of the modified examples explained hereinafter in combination.

1. Modified Example 1

Although in the above description of the embodiment, there is explained the example in which the first correction point moves along the plurality of axes, the first correction point can also move along a single axis. On this occasion, the same emphasis can also be provided to the line segment A and the line segment B.

Figure 10:
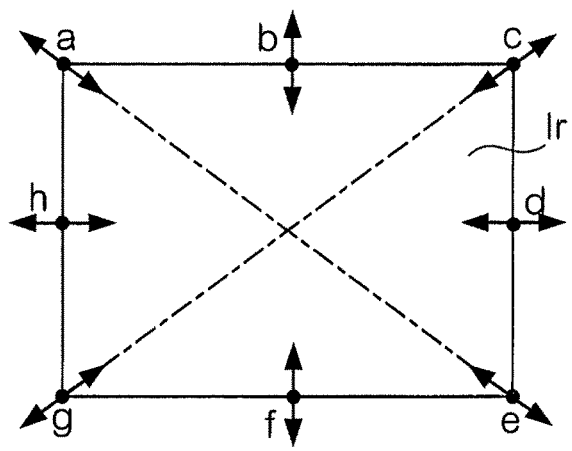
FIG. 10 is a diagram showing an example of moving directions of the correction points according to modified example 1.

FIG. 10 is a diagram showing an example of the moving directions of the correction points according to the modified example 1. In the example shown in FIG. 10, the point b and the point f move along the axis in the y-axis direction. The point d and the point h move along the axis in the x-axis direction. The point a, the point c, the point e, and the point g move along the diagonal lines of the correcting image Ir.

Figure 11A:
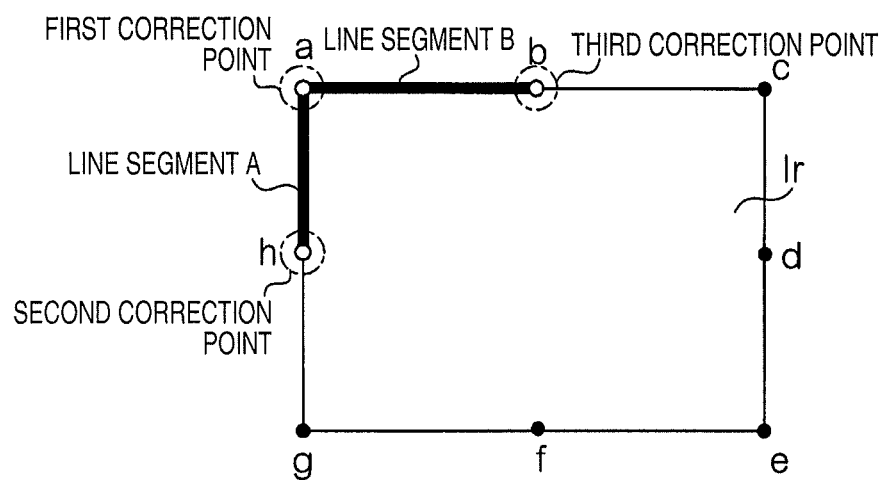
FIGS. 11A and 11B are diagrams showing an example of emphasis of the correcting image according to modified example 1.
Figure 11B:
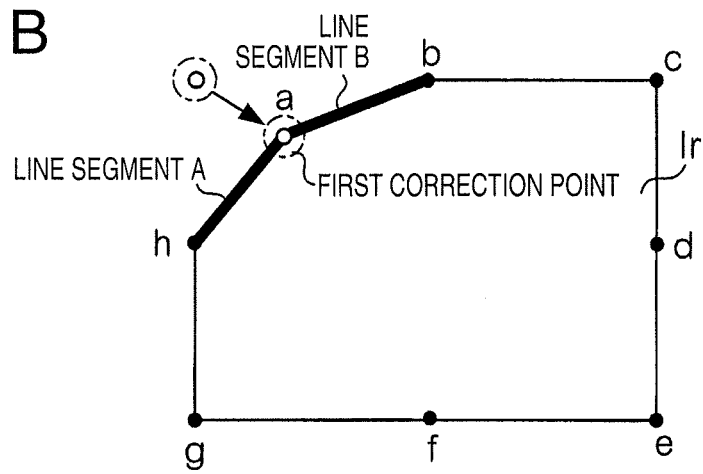

FIGS. 11A and 11B are diagrams showing an example of the emphasis of the correcting image Ir according to the modified example 1. FIG. 11A shows the emphasis of the correcting image Ir in the case in which the first correction point is the point a similarly to FIG. 5. In the example shown in FIGS. 11A and 11B, the emphasis with the thick line and the solid line is provided to both of the line segment A and the line segment B. When the point a is moved, the correcting image Ir changes as shown in, for example, FIG. 11B. It should be noted that in the embodiment described above, the second correction point and the third correction point are separately identified in order to provide emphasis different between the line segment A and the line segment B. In this respect, in the case of providing the same emphasis to the line segment A and the line segment B as in the modified example 1, it is not required to identify the second correction point and the third correction point separately from each other. In other words, the CPU 10 can identify either of the previous correction point of the first correction point and the next correction point thereof in the order represented by the identifiers as the second correction point or the third correction point.

2. Modified Example 2

The number and the positions of the correction points are not limited to those in the above description of the embodiment. The number of the correction points can be larger or smaller than 8. For example, the correction points can be disposed only at the respective vertexes of the correcting image. Further, the positions of the correction points are not limited to the positions on the outline of the correcting image Ir. The correction points can also be disposed at any positions in the correcting image Ir.

3. Modified Example 3

The area to be geometrically corrected in the main image is not limited to the area corresponding to the operation area described above. It is also possible that the main image and the correcting image are made to correspond to each other by the area obtained by dividing these images into four areas (into two areas in vertical and horizontal directions), and the projective transformation corresponding to the movement of the first correction point is performed on the pixels in the area of the main image corresponding to the area to which the first correction point belongs.

4. Modified Example 4

The process related to the invention is not limited to the process described in the above flowchart. For example, although in the above description of the embodiment, there is described the example in which the composite image obtained by combining the main image and the correcting image with each other is projected, the correcting image can also be projected on the screen SC alone. On this occasion, the composite image is not generated, the correction of the main image can be performed after the termination instruction is input. In another example, it is also possible to perform the projective transformation corresponding to the movement of the first correction point on the correcting image in the step S110 in addition to the drawing of the line segment A and the line segment B.

5. Modified Example 5

The shape, the texture, and the color of the correcting image are not limited to those described in the description of the embodiment. The correcting image can also have a polygonal shape other than the rectangular shape. In another example, the correcting image can also be a solid black image. Further, the correcting image can also include a character or a figure.

6. Modified Example 6

The distortion correction process is not limited to the process performed in response to the operation of the controller RC. The distortion correction process can also be performed in response to, for example, the user operating the operation panel 80. Further, the operation of the controller RC described in the above description of the invention is illustrative only, and the input of a variety of instructions to the projector 1 can also be performed by an operation method different from the operation described above.

7. Modified Example 7

Although in the above description of the embodiment, the example of performing the emphasis of the line segment A and the line segment B is explained, it is also possible to emphasize the area including the line segment A and the line segment B. For example, the operation area Sh shown in FIGS. 8A and 8B can also be emphasized. The emphasis of an area is performed by, for example, changing the color, the width, or the type of the outline of the area from the color, the width, or the type of the outline of the reference area, or by changing the texture or the color of the area from the texture or the color of the reference area. The reference area is, for example, any of other areas than the operation area Sh among the areas constituting the correcting image, or in the case in which the first correction point is changed, the reference area is the area before the change, which corresponds to the operation area Sh after the change.

Further, the emphasis of the line segment described in the above description of the embodiment is illustrative only, and emphasis other than the emphasis described above can also be provided.

8. Modified Example 8

The control program 20A executed by the projector 1 in the embodiment can also be provided in a state of being stored in a variety of storage media such as a magnetic recording medium (e.g., a magnetic tape and a magnetic disk (HDD, FD (Flexible Disk)), an optical recording medium (e.g., an optical disk (CD (Compact Disk), DVD (Digital Versatile Disk))), a magneto-optical recording medium, or a semiconductor memory (e.g., flash ROM). Further, the control program 20A can also be downloaded via a network such as the Internet.

9. Other Modified Examples

Even in the case in which the first correction point moves along a plurality of axes, the same emphasis can be provided to the line segment A and the line segment B.

The internal configuration of the projector 1 is not limited to the configuration explained with reference to FIG. 1. The projector 1 can have any internal configuration providing the process of each of the steps shown in FIG. 2 can be executed.

What is claimed is:

1. An image processing device comprising:
    a selection processor section adapted to select a first correction point among a plurality of correction points included in a correcting image;
    an identification processor section adapted to identify a second correction point and a third correction point adjacent to the first correction point; and
    a display control processor section adapted to emphasize a first line segment connecting the first correction point and the second correction point to each other, and a second line segment connecting the first correction point and the third correction point to each other, the first and second line segments emphasized as compared with a line segment other than the first and second line segments, which together form an outline of the correcting image before movement of the first correction point, the first line segment being emphasized differently than the second line segment and only the first and second line segments being emphasized and not any other portion of the correcting image, and display the correcting image on a display section, whereby image distortion is corrected, wherein the display control processor section provides the emphasis, which is different between before and after the selection of the first correction point is fixed by a user, to the first line segment and the second line segment, and displays the correcting image on the display section, and in a case in which the first correction point moves along a line, the display control processor section provides the emphasis different between the first line segment and the second line segment before the movement of the correction point to the first line segment and the second line segment after the movement of the correction point, and displays the correcting image on the display section.

2. The image processing device according to claim 1, wherein in a case in which the first correction point moves along a single axis, the display control processor section provides the same emphasis to the first line segment and the second line segment, and displays the correcting image on the display section.

3. The image processing device according to claim 1, wherein the display control processor section displays an image corrected in accordance with movement of the first correction point together with the correcting image deformed due to the movement of the first correction point on the display section.

4. The image processing device according to claim 1, wherein the emphasis is performed by one of
changing one of a color, a width, and a type of the first line segment and the second line segment from one of a color, a width, and a type of other line segments than the first line segment and the second line segment among line segments forming the outline of the correcting image, and blinking the first line segment and the second line segment.

5. A projector comprising:

a projection processor section adapted to project an image on a projection surface;

a selection processor section adapted to select a first correction point among a plurality of correction points included in a correcting image;

an identification processor section adapted to identify a second correction point and a third correction point adjacent to the first correction point in a predetermined direction; and a display control processor section adapted to emphasize a first line segment connecting the first correction point and the second correction point to each other, and a second line segment connecting the first correction point and the third correction point to each other, the first and second line segments emphasized as compared with a line segment other than the first and second line segments, which together form an outline of the correcting image before movement of the first correction point, the first line segment being emphasized differently than the second line segment and only the first and second line segments being emphasized and not any other portion of the correcting image, and make the projection processor section project the correcting image, wherein the display control processor section provides the emphasis, which is different between before and after the selection of the first correction point is fixed by a user, to the first line segment and the second line segment, and displays the correcting image on the display section, and in a case in which the first correction point moves along a line, the display control processor section provides the emphasis different between the first line segment and the second line segment before the movement of the correction point to the first line segment and the second line segment after the movement of the correction point, and displays the correcting image on the display section.

* * * * *